United States Patent [19]

Karr, Jr.

[11] 3,952,994
[45] Apr. 27, 1976

[54] THROTTLING AND SHUT-OFF VALVE

[76] Inventor: Michael A. Karr, Jr., 9353 Rosstown, Houston, Tex. 77055

[22] Filed: Oct. 21, 1974

[21] Appl. No.: 516,795

[52] U.S. Cl. ............................. 251/210; 251/332; 251/333
[51] Int. Cl.² ...................................... F16K 25/00
[58] Field of Search ................ 251/210, 333, 332

[56] References Cited
UNITED STATES PATENTS

| 1,301,278 | 4/1922 | Labus | 251/332 |
|---|---|---|---|
| 2,692,750 | 10/1954 | Davis, Jr. | 251/210 |
| 3,071,344 | 1/1963 | Banks | 251/210 |
| 3,145,010 | 8/1964 | Karr, Jr. | 251/214 X |
| 3,153,421 | 10/1964 | Webster | 251/210 X |
| 3,428,076 | 2/1969 | Lowe | 251/333 X |
| 3,809,362 | 5/1974 | Baumann | 251/332 |

Primary Examiner—Arnold Rosenthal

[57] ABSTRACT

A throttling valve which includes a stem having a shoulder thereon. The lower end of the valve stem extends into a valve seat. The stem includes a shoulder which forces the seat downwardly. The seat mechanism incorporates a seal which encircles the stem. The shoulder on the stem engages a wedge-shaped member driven into a softer member, causing radial expansion to tighten snugly about the stem. A fixed seat member is also incorporated. This enables throttling without erosion of the components when the flow is cut to a trickle, particularly in high pressure circumstances.

6 Claims, 2 Drawing Figures

THROTTLING AND SHUT-OFF VALVE

RELATED APPLICATIONS

U.S. Pat. No. 3,145,010.

BACKGROUND OF THE INVENTION

In the throttling valve of the mentioned reference, the apparatus functions quite well. However, the improvement of the present invention enables greater life to be obtained from the valve seal mechanism. The seal mechanism is substantially improved over the apparatus shown in the referenced patent in the provision of a seal mechanism spaced between a shoulder on the valve stem proper and the valve seat, the seal mechanism including a wedge-shaped member which is driven into a softer encircling seal. The relative material hardness causes the seal ring to expand radially inwardly and outwardly, thereby creating a snug seal around the stem and preventing leakage along the stem. When the device is opened, the wedge-shaped member is relaxed, thereby enabling the seal member to relax and the radial force between the seal and the stem is reduced. This, then, enables flow through through the throttling valve along the stem. The seal, wedge member, and shoulder on the stem are arranged above a seat member formed of harder material to provide a means of closure for the apparatus.

SUMMARY OF THE INVENTION

The present invention is an improvement in a throttling valve which incorporates a throttling valve mechanism whereby an elongate stem having a shoulder around the stem is threaded into a valve seat to close flow. Flow through the valve is from an inlet along the stem past the shoulder toward the outlet. The shoulder travels on rotation of the stem. The shoulder preferably travels toward a wedge-shaped ring. The profile of the ring includes a sharp angle which faces a softer ring of sealing material. The sealing material is softer, thereby enabling the wedge to take a bite in the softer material, forcing it radially. Preferably the softer material which forms the seal ring is faced by upper and lower wedges which are similarly constructed. The lower wedge rests on a circular seat member. The shoulder on the stem forces both wedges against the softer material, thereby providing radial expansion and sealing contact against the stem. The lower end of the stem extends into the seat member, thereby providing a final seal.

DESCRIPTION OF THE PREFERRED EMBODIMENT

Figure 1:
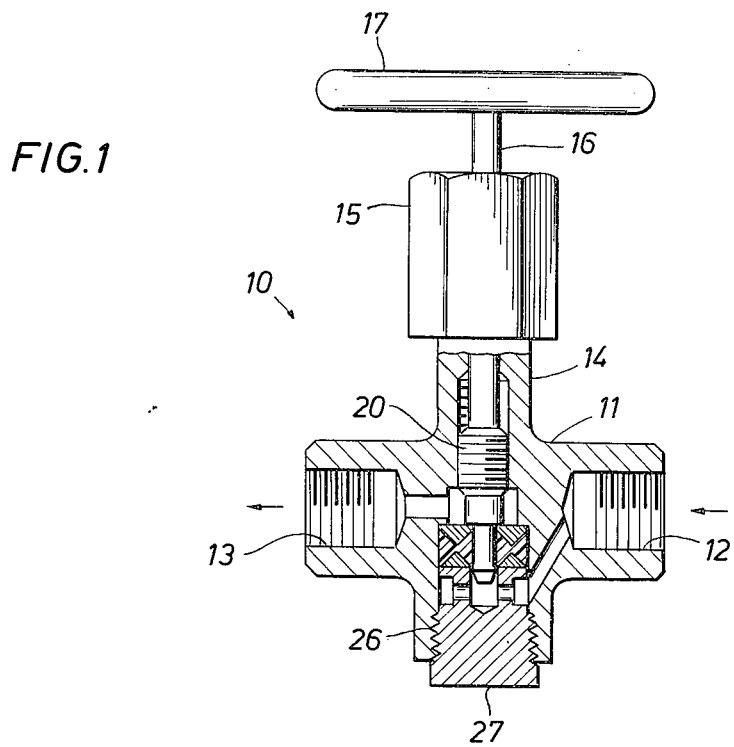
FIG. 1 is a sectional view through the improved valve showing an inlet and outlet diametrically opposite to one another; and, FIG. 2 is an enlarged sectional view through the stem, seat, wedge-shaped members, and soft seal ring of the improvement, which provide an improved seal in the apparatus.

In FIG. 1, a valve 10 is an improved throttling and shut-off valve of the sort taught in U.S. Pat. No. 3,145,010. The valve includes a body 11 which has an internally threaded inlet 12 and a similar internally threaded outlet 13. The valve body includes an upstanding portion 14 which is axially hollow. The body portion 14 is threaded at its upper end to receive a cap 15 and a stem 16 extends through the cap to position a hand wheel 17 which can be grasped and rotated. Other techniques for rotation are readily known, including the use of various motors for rotation of the stem.

An enlargement 20 on the stem 16 is engaged with a set of threads formed in the interior of an axial passage in the upstanding portion 14. Rotation in one direction moves the enlargement 20 upwardly, and rotation in the opposite direction moves it downwardly. The enlargement 20 has a range of travel defined by the threads on the interior. It is not necessary to permit it to move any higher than necessary, and the internal passage within the upstanding portion 14 terminates at some point.

Figure 2:
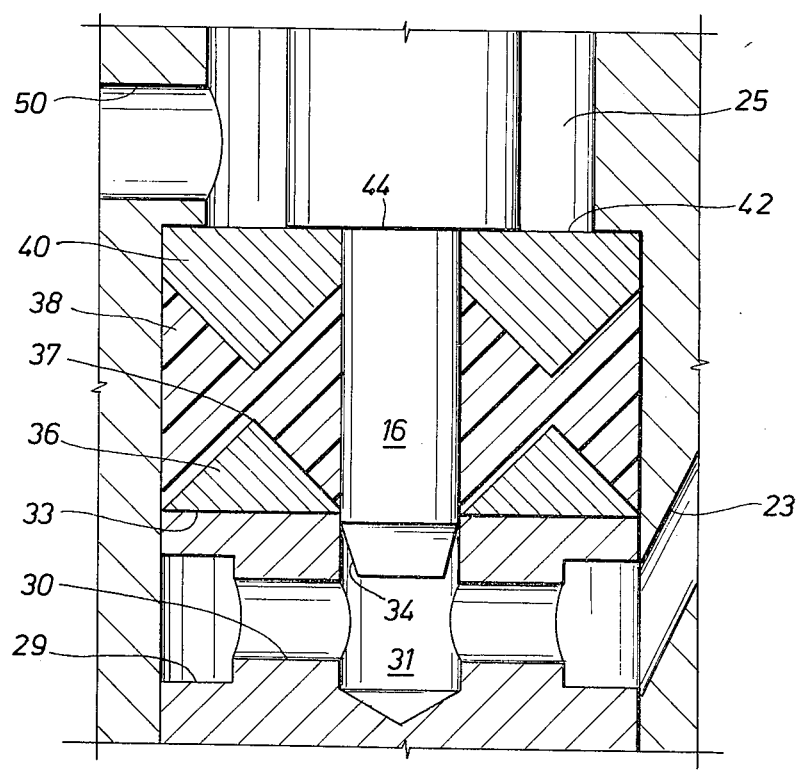

The valve body 11 includes a passage 23 shown in FIG. 2 which extends to a large internal chamber 25. The chamber 25 extends to the bottom of the valve body 11 which is threaded at 26. A plug 27 threads upwardly into the enlarged cavity 25. This aligns with the passage in the valve stem 16 previously mentioned. The plug 27 is externally threaded. The threads terminate at an external groove 29. The groove 29 is positioned at the right elevation to align with the passage 23 so that fluid delivered to the valve moves through the groove 29 to all points about the valve plug 27. Radial passages 30 are drilled from the groove 29 to a central opening 31. The central opening or passage 31 is concentric with the plug 27. The radial passages 30 deliver fluid to the concentric passage 31.

The plug 27 terminates at an upper end face 33 which is interrupted by the passage 31, thereby defining a valve seat. The stem 16 extends downwardly to its lower end where it has a tapered edge or face 34. The tapered edge or face 34 passes smoothly into the passage 31. The full diameter of the stem 16 fits snugly in the passage 31 of the face 33 to provide a closure against fluid flow as will be described.

The cavity 25 is closed by the plug 27 at the bottom. The cavity 25 also receives a wedge-shaped ring 36. It has a sharp edge 37. The angle of the edge 37 is best in the range of 5° to 20°. A greater angle tends to cut too readily. It is preferably formed of a fairly hard material. The hardness of the material is to be contrasted with a seal ring 38. The seal ring 38 is formed of a softer material. The ring 36 is preferably formed of a high quality steel, brass or copper, while the ring 38 is preferably formed of a resilient material such as polyurethane, butadyene and the like. Harder materials can be used. Materials which are softer and more readily deformable also can be used. The ring 38 is positioned just below a second wedge-shaped ring 40. It tapers to a point which is forced into the ring 38. The ring 40 has a flat upper face 42. The flat upper face 42 engages a surrounding shoulder 44 on the stem 16. The shoulder 44 is sufficiently large to prevent its entry into the ring 40. The ring members 36, 38 and 40 are all formed with an axial passage sized to fit the stem below the shoulder 44, but sufficiently small to prevent their movement past the shoulder 44.

The cavity 25 is drained by a lateral passage 50 which connects with the threaded opening 13 at the outlet. This provides a path of egress from the cavity whereby the outlet flow is controlled by the valve 10 of the present invention.

The operation of the equipment is noteworthy. The rings 36 and 40 have wedge-shaped faces which bite into the softer seal ring 38. The seal member 38 is formed of a softer material so that it yields. However, its physical capture between the rings 36 and 40 on the interior of the valve body constrain the direction of plastic flow of the ring 38. Its flow is constrained to a radial direction. As the valve is tightened, the shoulder 44 bears harder on the ring 40, thereby forcing the ring 40 to bite deeper into the seal member 38. When this occurs, the seal flexes and flows radially. It tends to flow radially outwardly and inwardly, thereby sealing the periphery of the wall of the cavity 25 to prevent leakage along the wall. It flows inwardly toward the stem and snugly surrounds the stem, thereby blocking the flow of fluid along the stem.

This arrangement enables the apparatus to be used as a throttling valve with a high pressure flow without fear of erosion of the valve seat mechanism. When the valve is first closed, the stem 16 is fairly snug against the resilient member 38 but it is not tight until the shoulder 44 lands on the ring 40.

As the stem is rotated, it travels through the seal member's axial passage until the tapered edge 34 is brought adjacent to the upper face 33. At this point, the flow of high pressure fluid past the seat and along the stem 16 is reduced. When the shoulder 44 lands on the wedge-shaped ring 40, the ring is forced downwardly and the wedge begins to compress the softer seal member 38. The wedge 36 also compresses it, the two acting together, and providing equal and opposite reactions on the seal ring. The seal ring flows radially to seal at its outer surface and against the stem 16, thereby preventing leakage along the stem 16.

The stressing of the seal member 38 is sufficient to cause it to yield and conform to the outer surface of the stem. This provides a good seal. Additional load applied to the stem obtains complete integrity of the seal about the stem 16. The tip surface 34 on the stem provides a throttling function as it is moved downwardly. In the event it becomes necessary to change the member 38, it can be readily removed by removing the plug 27 and dropping the rings 36, 38 and 40 out from the bottom of the body. They can be quickly replaced. This can be achieved without removing the valve from service.

The foregoing is directed to the preferred embodiment of the present invention. The scope is determined by the claims which follow.

I claim:

1. A throttling and shut-off valve comprising:
   a valve body having inlet and outlet ports;
   a valve stem extending into said body and having a downwardly facing shoulder on said stem;
   a passage extending from said inlet port to an internal circular cavity within said valve body where said stem is positioned;
   a valve seat member adapted to be positioned in said cavity;
   means for delivering fluid through said passage to said seat member;
   said seat member cooperating with said stem to throttle flow through the valve apparatus;
   a ring of seal material surrounding said stem within said cavity;
   a facing ring having a tapered face in contact with said seal ring within said cavity, said tapering face being constructed and arranged relative to the shoulder on said stem to move toward said seal ring to cause said seal ring to expand radially toward the stem which extends through said seal ring and thereby provide a seal along said stem and which seal ring expands radially outwardly against the well of said cavity to seal thereagainst; and,
   an outlet port communicated with said cavity for delivery of fluid flow along said stem on moving past said valve seat.

2. The apparatus of claim 1 including a second facing ring axially centered on said stem and having a face adjacent to and contacting said seal ring, one facing ring above and the other below said seal ring, said facing rings having non-parallel tapered faces which cause flow of said seal ring.

3. The apparatus of claim 2 wherein said faces include a pair of faces which intersect at a point when viewed in cross section.

4. The apparatus of claim 3 wherein said point extends into said seal ring.

5. The apparatus of claim 4 wherein said point is an edge when facially viewed, said seal ring being circular.

6. The apparatus of claim 5 wherein said point inscribes an angle ranging between 5° and 20°.

* * * * *